OTHAR M. KIEL INVENTOR.

Dec. 29, 1970     O. M. KIEL     3,550,445
METHOD FOR TESTING WELLS FOR THE EXISTENCE OF PERMEABILITY DAMAGE
Filed Jan. 19, 1968     3 Sheets-Sheet 3

INVENTOR.
OTHAR M. KIEL

BY *James E. Reed*

ATTORNEY

United States Patent Office 3,550,445
Patented Dec. 29, 1970

3,550,445
METHOD FOR TESTING WELLS FOR THE EXISTENCE OF PERMEABILITY DAMAGE
Othar M. Kiel, Houston, Tex., assignor to Esso Production Research Company, a corporation of Delaware
Filed Jan. 19, 1968, Ser. No. 699,256
Int. Cl. E21b 47/00
U.S. Cl. 73—155        6 Claims

ABSTRACT OF THE DISCLOSURE

A method for detecting formation damage, including the steps of withdrawing well effluent including a separate gas stream from a well at a substantially constant rate for a period sufficient to achieve pressure stabilization within the producing formation, restricting the flow of gas so as to cause the pressure of the separate gas stream to increase, measuring the increase of gas pressure as a function of time, and determining whether the relationship between pressure buildup and time is substantially linear or nonlinear.

BACKGROUND OF THE INVENTION (1) Field of the invention

This invention relates to the testing of wells and is particularly concerned with a method for determining whether permeability damage exists in the producing formation near the wellbore.

(2) Description of the prior art

One of the common problems associated with the production of crude oil and natural gas is that of overcoming permeability damage to the producing formation. Such damage results in a decrease in productivity of the producing formation and often results in a higher gas-oil ratio because of the increased pressure drawdown required to produce fluid at a particular rate. Where damage is known to exist, remedial operations such as fracturing or acidizing can often be used to restore the permeability, thus increasing productivity and decreasing the gas-oil ratio.

Diagnostic well testing methods for the assessment of permeability damage are known in the petroleum industry. The methods employed heretofore generally require the introduction of a bottom-hole pressure measuring device into the wellbore, placement of the device adjacent to the producing formation, and observation of pressure buildup over a period of time after the well is shut in. Such measurements are expensive and, because the well must be shut in, result in lost or deferred production. Moreover, for a meaningful test, accurate reservoir fluid data which can only be obtained by an expensive subsurface fluid sample analysis are required.

Pumping wells are particularly difficult to test by existing methods because the sucker rods suspended within the tubing string prevent the introduction of a subsurface pressure measuring device. Fluid level measurements have been used to indicate the buildup behavior but such measurements are often unreliable because of foaming of the oil in the annulus, restrictions in the annulus, paraffin buildup, and other conditions which cause false fluid level readings. In order to get meaningful bottom-hole pressure buildup data on pumping wells, the sucker rods must therefore generally be pulled from the well. This is expensive and time-consuming. Moreover, it normally results in loss of the early portion of the pressure buildup data required to describe the reservoir properties near the wellbore. For these reasons, existing well test methods for detecting permeability damage leave much to be desired.

SUMMARY OF THE INVENTION

The well test method of this invention alleviates the problems inherent in existing methods of testing wells for permeability damage. This test can be performed on any well that produces an effluent that includes a separate gas stream. Application of the method requires the withdrawal of well effluent including the separate gas stream from the well at a substantially constant rate until pressure stabilization within the producing formation is attained. Gas flow is then restricted so that gas pressure will increase and variations in gass pressure a a function of time are oberved to determine whether the relationship between pressure buildup and time is substantially linear, indicating a damaged well, or is substantially nonlinear and is thus characteristic of an undamaged well. In applying the method to a gas well, gas is withdrawn at a constant rate from the tubing until pressure stabilization within the producing formation is achieved. Gas flow through the tubing is then restricted slightly so as to cause an increase in flowing pressure or completely so that no more gas is produced. The buildup of gas pressure in the tubing is recorded as a function of time to determine whether it is linear and thus characteristic of a damaged well. Similarly, the test can be performed on any pumping oil well that produces through a string of production tubing suspended within a casing string to form a continuous casing-tubing annulus. First, oil and any associated water are produced at a constant rate through the tubing. Gas is simultaneously produced at a constant rate through the annulus. This is continued for a sufficient period of time to achieve pressure stabilization within the producing formation. The annulus is then restricted so as to cause an increase in flowing gas pressure or is completely shut in so that no more gas is produced. Production of liquid through the tubing string at substantially the same rate is continued. Variations in annulus pressure as a function of time are observed to determine whether the relationship between pressure buildup and time is substantially linear, indicating a damaged well. This method can be used to determine the existence of permeability damage without the use of a subsurface pressure device and without removing the sucker rods from an oil well, can be conducted while producing the well in its normal fashion, and requires no equipment that is not commonly available in the field. The test results are not affected by conditions which may lead to false acoustical fluid level measurements. The well test method of the invention therefore has many advantages over test methods used in the past.

DESCRIPTION OF THE PREFERRED EMBODIMENTS

Figure 1:
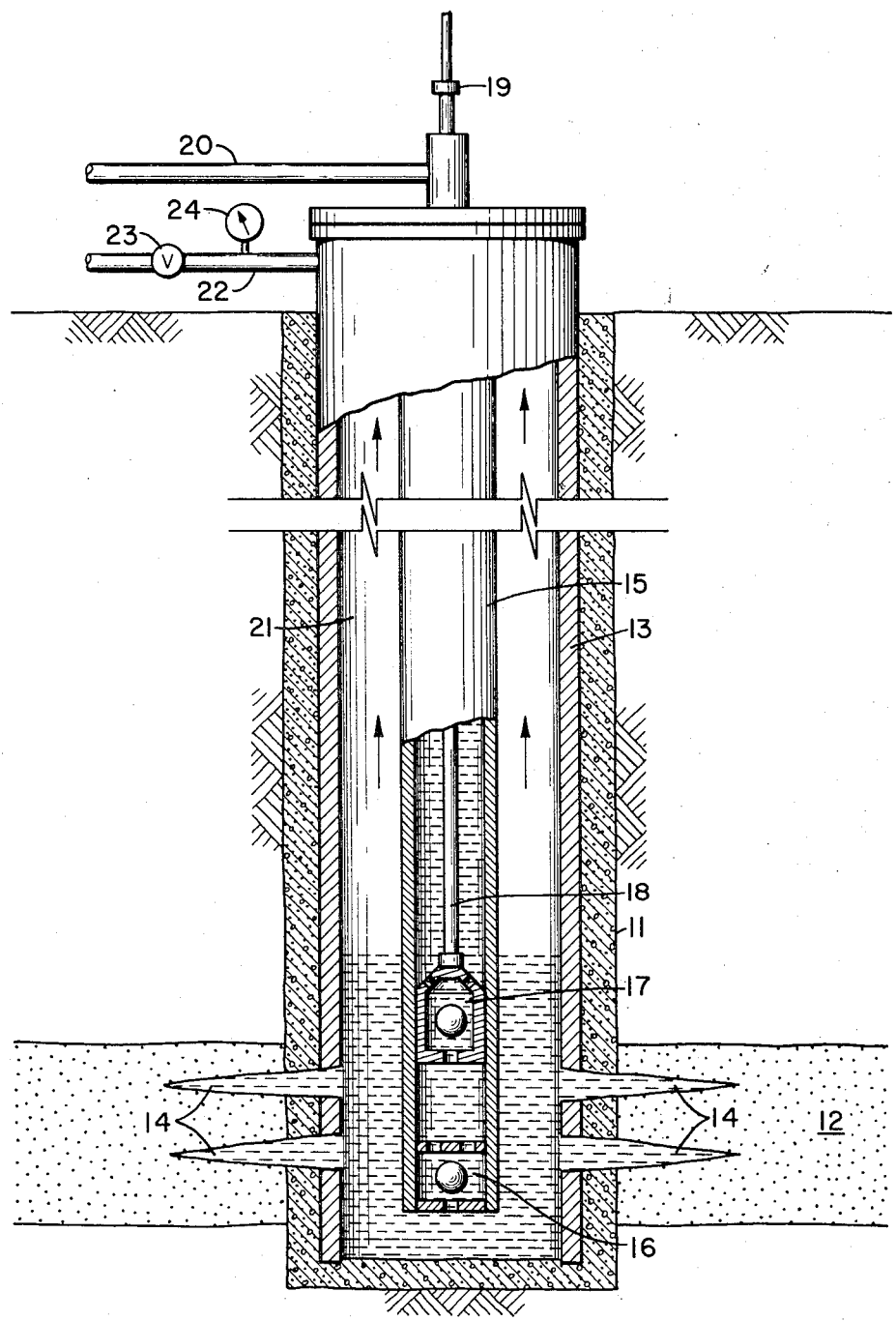
FIG. 1 depicts a pumping oil well suitably equipped for performance of the well test of the invention.

The producing oil well shown in FIG. 1 includes a borehole 11 drilled through a producing formation 12 and a casing string 13 that has been cemented in place. Perforations 14 in the casing permit communication between the producing formation and the wellbore. Suspended from a tubing hanger in the wellhead is a string of production tubing 15 with a standing valve 16 mounted in the lower end of the string. The tubing hanger is not shown. A pump 17 is mounted in the tubing above the standing valve and is reciprocated by a string of sucker rods 18 suspended from the surface. Reciprocating motion is imparted to the string of sucker rods at its upper end above packing box 19 by a sucker rod pumping unit not shown. Oil and gas flow from the producing formation through the perforations into the casing-tubing annulus. The oil is pumped up the production tubing and through line 20 to storage not shown. Gas flows up the casing-tubing annulus 21, through line 22 and valve 23 to suitable gas processing equipment which is also not shown. Pressure gauge 24 is mounted in line 22 to measure the buildup of gas pressure in the annulus when valve 23 is closed.

Prior to the performance of the test, the well must be produced until a substantially stabilized pressure condition is obtained throughout the producing formation. This can be done by first pumping the well for a sufficient length of time to reduce the annulus fluid level to or near that of the standing valve. Fluid level measurements or dynamometer tests can be conducted in the field by unskilled personnel to confirm that the well has pumped down. Thereafter, production should be continued at substantially the same rate for a sufficient period of time for pressure stabilization to be achieved. Methods for estimating the time required to achieve stabilization for a particular producing rate and for particular reservoir characteristics have been suggested, but in most practical applications sufficient pressure stabilization can be achieved by simply pumping the well at a constant rate for twenty-four hours.

Figure 2:
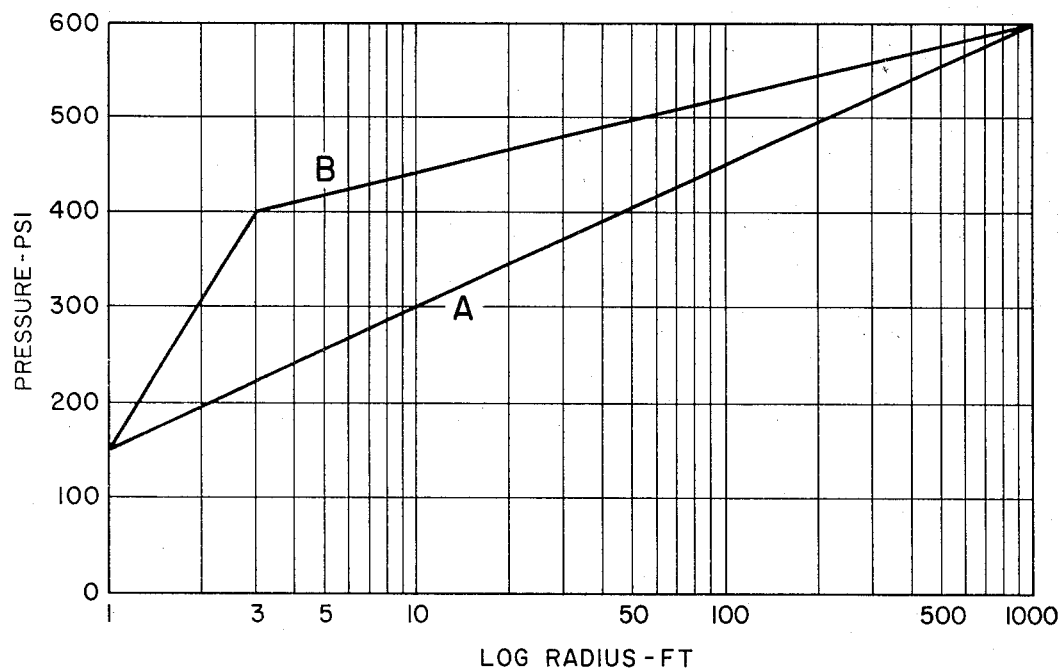
FIGS. 2 and 3 illustrate the distribution of pressures as functions of the log of the radius and of the radius of the wellbore, respectively, for typical damaged and undamaged producing formations.

After pressure stabilization of the producing formation has been achieved and quasi steady-state flow conditions exist within the reservoir, the distribution of pressure within hypothetical undamaged and damaged reservoirs will be as depicted in FIG. 2. As shown by curve A in FIG. 2, pressure increases linearly as a function of the log of the radius from the wellbore to the external radius of drainage for an undamaged well. For these hypothetical wells, the radius of drainage is taken as 1000 feet. The radial pressure distribution for a reservoir with permeability damage is radically different. As shown by curve B in FIG. 2, the pressure increases very rapidly from the radius of the wellbore to the radius of damage, here 3 feet, and then very gradually increases to the external limit of radial drainage.

Figure 3:
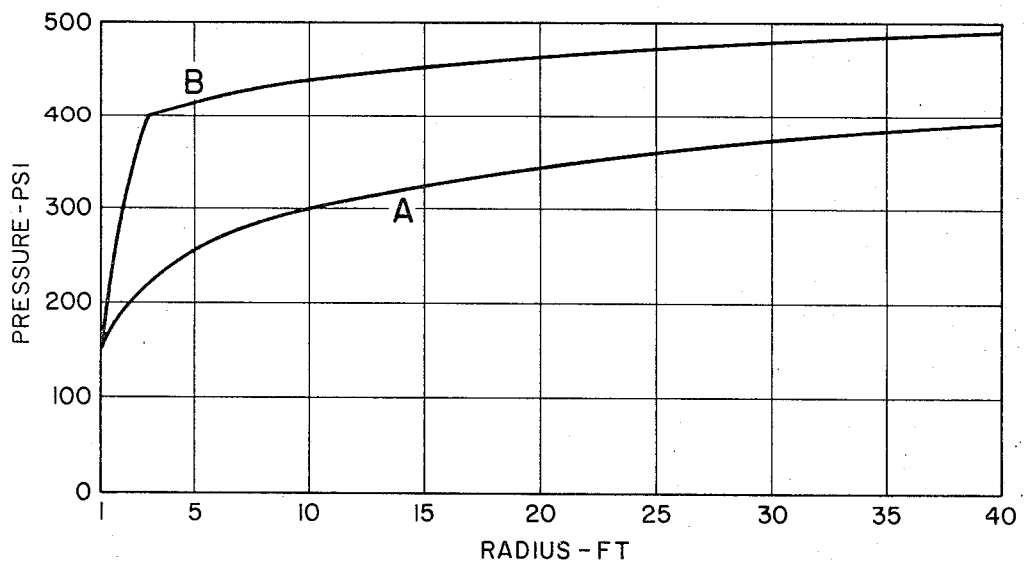
Figure 4:
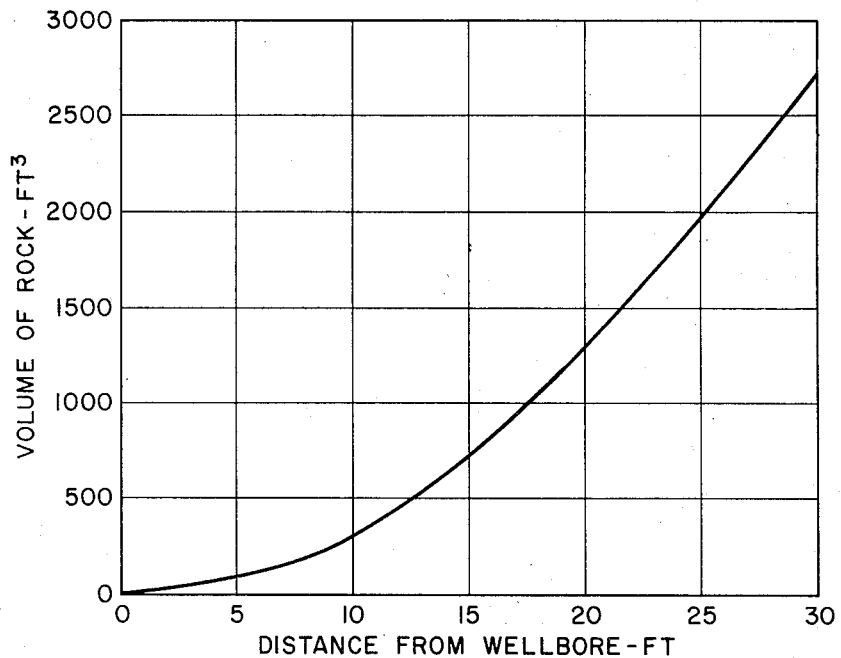
FIG. 4 shows the volume of reservoir rock per foot of thickness contained between the wellbore and any radius.

The difference between the pressure distributions in damaged and undamaged wells is emphasized in FIG. 3, which depicts the same pressure distributions on Cartesian coordinates for the first 40 feet from the wellbore. Curve B in FIG. 3 indicates that the pressure is less than 400 p.s.i. in that part of the reservoir within a radius of 3 feet of the hypothetical damaged well. In comparison with this pressure sink, the remainder of the reservoir has not been substantially affected. Withdrawals from the undamaged well, on the other hand, have reduced the reservoir pressure to a value below 400 p.s.i. at a radius of 40 feet. It can thus be seen that withdrawals from the undamaged reservoir will substantially lower pressures much farther out into the reservoir than will withdrawals from the damaged reservoir. From FIG. 4 it can further be observed that the volume of reservoir rock per foot of thickness contained within a radius of 3 feet is 50 ft.$^3$. Although the volume contained within a radius of 40 feet is too great to be shown in FIG. 3, the volume contained within a radius of 30 feet exceeds 2500 ft.$^3$. From this it is apparent that the pressure disturbance created by the constant withdrawal of fluid from the wellbore of the damaged well affects only a small volume of the reservoir in comparison to the volume affected in an undamaged well.

After stabilization is achieved, the casing-tubing annulus is restricted slightly so as to cause an increase in flowing gas pressure or completely shut in so that no more gas is produced from it. Production of liquids is continued at a substantially constant rate by continuing to operate the pumping unit at the surface. Since oil production continues at substantially the same rate, the liquid level remains at substantially the same level in the annulus. This results in a fixed annular storage zone. Gas will continue to flow into this storage zone in the casing-tubing annulus and will gradually cause pressure buildup within the annulus.

Pressure measurements are taken at the casing-tubing annulus at the surface. These can be made by reading a pressure gauge at various time intervals. Instead, a continuous pressure recorder may be utilized. Other methods of pressure recordation are also suitable. The pressure buildup behavior of interest is that observed during early pressure buildup time. Field observations indicate that a buildup of two atmospheres is generally sufficient to give the desired diagnostic pressure behavior.

Figure 5:
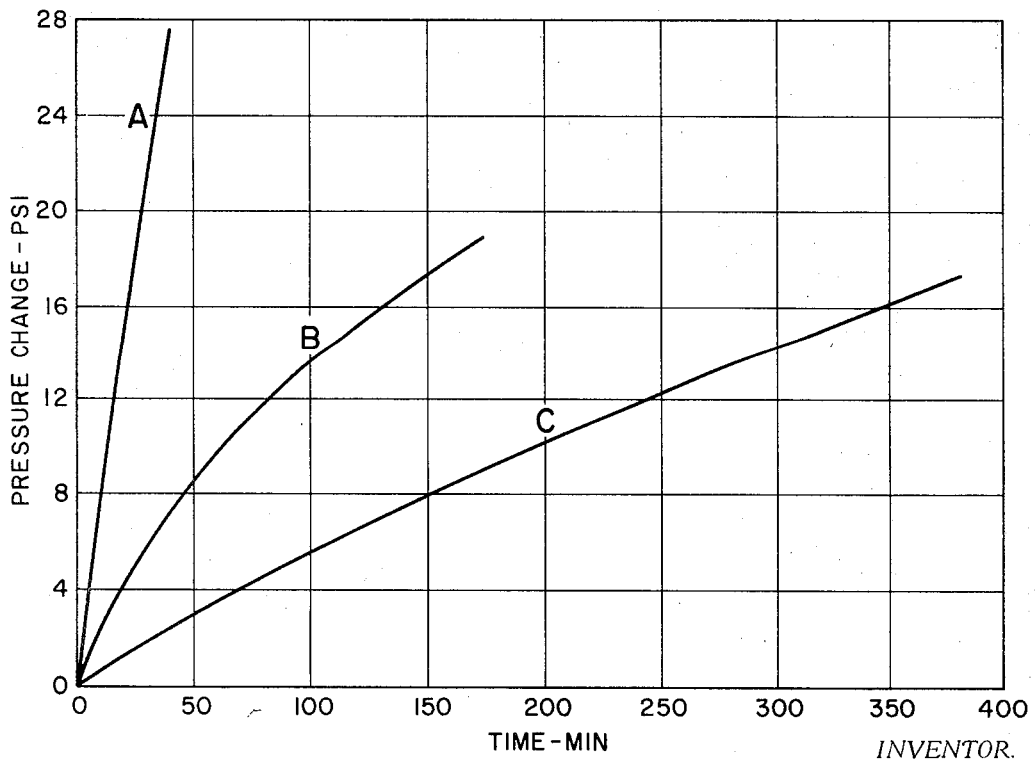
FIG. 5 depicts typical pressure buildup data recorded while testing oil wells in accordance with the invention.

Examination of the relationship between pressure buildup and time indicates whether permeability damage exists. In those wells where such damage does exist, an approximately linear relationship between pressure buildup and time will be observed. This indicates that the gas is being stored in a zone of substantially constant volume. In undamaged wells, the pressure-time relationship will be curvilinear and the slope of the curve will decrease with time, indicating that the gas is being stored in a zone of increasing volume. FIG. 5 graphically illustrates the pressure buildup data recorded during actual field tests of the invention. Curve B shows the results obtained in an undamaged well; while curves A and C represent the results in damaged wells.

The difference between pressure buildup behavior in damaged and undamaged wells is due to the difference between the pressure distribution in an undamaged radial system and that in a damaged radial system, as shown in FIGS. 2 and 3. When the pressure is increased slightly by gas accumulation in the wellbore, a pressure adjustment takes place in the reservoir. This alters the existing pressure profile. In the undamaged case, a relatively large reservoir volume is available for the storage of gas because of the extensive volume of the reservoir that has been significantly disturbed by production of fluids from it. Pressure buildup within the undamaged producing formation will follow the classic pattern described by the diffusivity equation so that, as buildup time increases, the disturbance created by shutting in the annulus will emanate farther and farther away from the wellbore out into the producing formation. The storage volume in the undamaged well thus increases as a function of time and hence the relationship between pressure buildup and time is nonlinear. For a damaged well, on the other hand, the volume of the annulus is substantially the only volume available for gas storage. Gas will continue to flow into the casing-tubing annulus at a substantially constant rate after shut-in. Since the volume of the casing-tubing annulus is constant, the resultant pressure buildup will be linear.

Although the invention has been discussed as applied to a pumping oil well, it should be apparent that it is equally applicable for testing gas wells and other similar wells. The procedure and theory are substantially the same in testing gas wells. The most striking difference is caused by the fact that the separate gas stream is for all practical purposes the only effluent from a gas well. This difference is reflected in the equipment that is used in completing gas wells primarily by the need for only one conduit from the producing formation to the surface. Usually such wells are completed either with a single string of tubing cemented within the borehole, or more conventionally, with a string of tubing having a packer at the lower end thereof suspended within a well casing thereby preventing gas from entering the annulus. However, because the separate gas phase is the only fluid flowing, the gas well test can be performed through the tubing alone—no flow through the annulus is required.

To implement the well test method of the invention on a gas well, gas is withdrawn at a substantially constant rate from the tubing for a period sufficient to achieve pressure stabilization within the producing formation. For most gas reservoirs a flow period of 72 hours will be sufficient to achieve pressure stabilization. Gas flow through the tubing is then restricted so as to cause an increase in flowing pressure or completely shut in so that no more gas is produced. The buildup of gas pressure in the tubing is recorded as a function of time to determine whether it is linear and thus characteristic of a damaged well in the same fashion in which an oil well is analyzed. Since the flow of gas into the wellbore will continue at the unrestricted rate only during the initial stages of pressure buildup, it is of course desirable to make pressure observations during the early stage of the buildup to insure valid test results.

To achieve best results on gas wells some consideration should be given to the amount of restriction that is imposed on the flow rate of gas. The amount of the flow restriction affects three aspects of the test: (1) amount of pressure buildup; (2) time period for the pressure buildup; and (3) radius of investigation of the producing formation by the pressure transient. The amount of pressure buildup that will be caused is significant insofar as it must be large enough to be conveniently measured. The amount of pressure buildup that will be caused may be estimated by calculating the amount of pressure drop that must be imposed across the producing formation to produce gas at a rate equal to the amount of the restriction using the well-known Darcy radial flow equation for gas. The time period over which the pressure buildup occurs must be long enough to permit measurement of the relationship between pressure and time and to induce a significant radius of investigation into the producing formation. It should therefore be extended for a period greater than five minutes if at all practical. The period of time to build up pressure one atmosphere in a damaged well can readily be calculated. Again, in damaged wells the storage volume available will for all practical considerations be the wellbore—here the volume of the tubing. Since the rate restriction imposed at the surface represents the rate of gas storage during the early portion of the buildup, both the storage rate and the storage volume are known. The period of time required to store a volume of gas which measured in standard cubic feet is equal to the storage volume of the wellbore is therefore the time required to increase gas pressure one atmosphere. Radius of investigation of the producing formation by the pressure transient must be sufficient to extend the storage volume of an undamaged well far enough away from the wellbore to cause pressure time behavior to depart from a linear relationship. Radius of investigation can be computed from the well-konwn diffusivity equations, whereas volume of the reservoir can be computed from FIG. 4 for a particular radius when thickness and porosity are known. Reservoir volume encompassed within the radius of investigation must be significant when compared with the volume of the wellbore to assure accurate results.

Preliminary computations of the above type are not generally required for oil wells because of the low gas-producing rates. Similarly, they can frequently be obviated for gas wells by flowing the well at a very low rate such as 50,000 s.c.f./day until stabilization and then completely shutting the well in and observing pressure buildup.

What is claimed is:

1. A method for testing a well to assess permeability damage in a producing formation surrounding the wellbore which comprises:
    (a) withdrawing well effluent including separate liquid and gas streams from said producing formation at substantially constant rates for a period sufficient to substatnially stabilize the pressure within the producing formation;
    (b) restricting the flow of said gas stream sufficiently to produce an increase in gas pressure within the wellbore without changing the flow of said liquid stream; and
    (c) recording said increase in pressure at the earth's surface as a function of time so as to determine whether the relationship between the pressure buildup and time is characteristic of a damaged well.

2. A method as defined by claim 1 wherein said gas stream is restricted to a level that will permit a substantially constant rate of gas storage in the wellbore if the well is damaged over a time period adequate to allow a significant radius of investigation by the pressure transient created by the restriction if the well is undamaged.

3. A method as defined by claim 2 wherein said gas stream is restricted so as to extend said period of substantially constant rate gas storage over a time period of at least five minutes.

4. A method of testing a liquid and gas-producing pumping well to determine whether permeability damage exists in the producing formation surrounding the wellbore while continuing to pump liquid to the earth's surface through a string of production tubing which comprises:
    (a) pumping liquid to the earth's surface through said tubing and withdrawing gas at the surface through the annulus surrounding said tubing at substantially constant rates for a period sufficient to achieve pressure stabilization within the producing formation;
    (b) restricting the flow of gas from said annulus to produce an increase in gas pressure in the annulus while continuing to pump liquid through the tubing at substantially the same rate; and
    (c) recording the increase in the annulus pressure at the earth's surface as a function of time so as to determine whether the relationship between the pressure buildup and time is approximately linear.

5. A method as defined by claim 4 wherein said gas flow is restricted to a level that will permit a substantially constant rate of gas storage in the wellbore if the well is damaged over a time period adequate to allow a significant radius of investigation by the pressure transient created by the restriction if the well is undamaged.

6. A method as defined by claim 5 wherein said gas stream is restricted so as to extend said period of substantially constant rate gas storage over a time period of at least five minutes.

References Cited
UNITED STATES PATENTS 3,321,965  5/1967  Johnson et al. _____ 73—155

RICHARD C. QUEISSER, Primary Examiner

A. E. KORKOSZ, Assistant Examiner

U.S. Cl. X.R.

166—250